(12) United States Patent
Asaro

(10) Patent No.: US 7,197,140 B2
(45) Date of Patent: Mar. 27, 2007

(54) SOUND BAFFLE FOR PORTABLE TELEPHONE HANDSET

(76) Inventor: V. Frank Asaro, 12551 Carmel Canyon Rd., San Diego, CA (US) 92130

( * ) Notice: Subject to any disclaimer, the term of this patent is extended or adjusted under 35 U.S.C. 154(b) by 719 days.

(21) Appl. No.: 10/613,617

(22) Filed: Jul. 3, 2003

(65) Prior Publication Data

US 2004/0071286 A1  Apr. 15, 2004

Related U.S. Application Data

(60) Provisional application No. 60/393,646, filed on Jul. 5, 2002.

(51) Int. Cl.
*H04M 1/00* (2006.01)

(52) U.S. Cl. .............. 379/433.03; 379/433.11; 379/433.12; 379/433.13

(58) Field of Classification Search .......... 379/433.01, 379/433.03, 433.11, 433.12, 434, 426; 455/575.1, 455/575.3, 575.4, 575.8; 381/337, 339, 361; 181/242
See application file for complete search history.

(56) References Cited

U.S. PATENT DOCUMENTS

| | | | | |
|---|---|---|---|---|
| 2,225,509 A | * | 12/1940 | Schober | ............ 181/242 |
| 2,245,724 A |   | 6/1941 | Scher | |
| 5,224,076 A | * | 6/1993 | Thorp | ............ 368/10 |
| 5,778,062 A |   | 7/1998 | Vanmoor | |
| 6,370,362 B1 | * | 4/2002 | Hansen et al. | ......... 455/90.1 |
| 6,751,487 B1 | * | 6/2004 | Rydbeck et al. | ....... 455/575.3 |

* cited by examiner

*Primary Examiner*—Curtis Kuntz
*Assistant Examiner*—Tuan Duc Nguyen
(74) *Attorney, Agent, or Firm*—Charmasson, Buchaca & Leach, LLP

(57) ABSTRACT

A sound baffle attached to a telephone handset comprises a pair of telescopically connected members shaped and dimensioned to act as a sound guide in combination with a reflecting cover plate that can be obliquely adjusted to direct the sound waves emitted by the user toward the handset microphone, and to muffle his conversation to the surroundings for improved privacy.

5 Claims, 1 Drawing Sheet

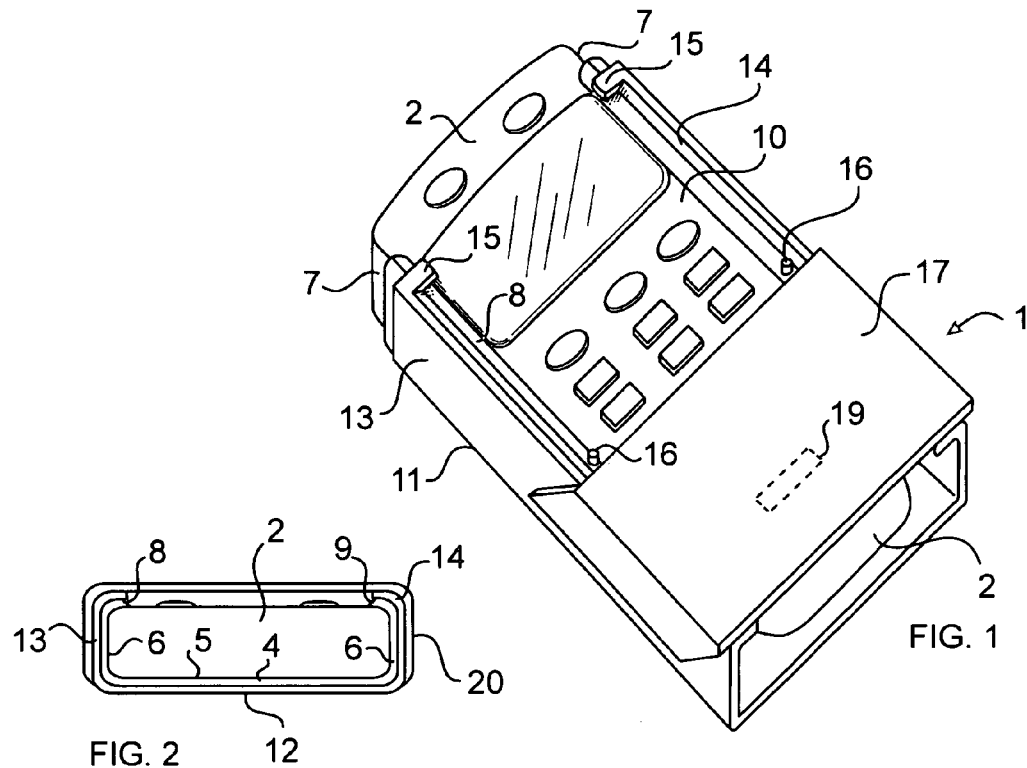
FIG. 1
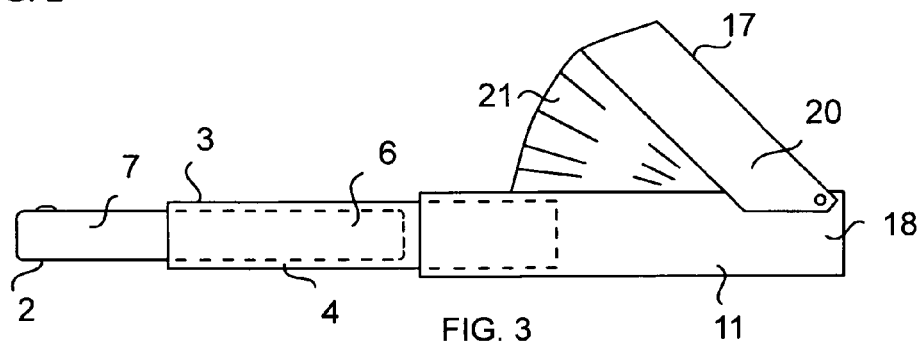
FIG. 2
FIG. 3
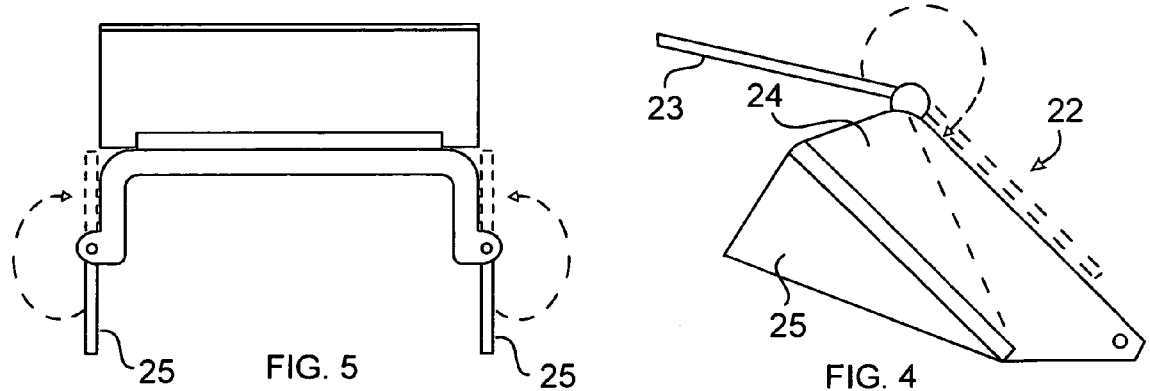
FIG. 5
FIG. 4

SOUND BAFFLE FOR PORTABLE TELEPHONE HANDSET

PRIOR APPLICATION

This is a continuation-in-part of provisional application Ser. No. 60/393,646 filed Jul. 5, 2002.

FIELD OF THE INVENTION

This invention relates to sound conditioning and damping structures, and more particularly to a combination of said structures with telephone handsets

BACKGROUND OF THE INVENTION

Wireless portable telephone handsets and in particular cellular telephone handsets tends to be very small size. Consequently, the distance between the speaker which a user commonly applies to one ear and the microphone can be less than 10 centimeters placing the microphone next to the user's cheek rather than the mouth. The microphone picks up only part of the sound waves emitted by the user forcing the latter to speak rather loudly to the detriment of privacy and the annoyance of surrounding persons. Because of the distance between the user's mouth and the microphone, the latter must be rather sensitive and yet cannot be unidirectional. Accordingly, the microphone tends to pick up a great deal of ambient noise.

The prior art has provided various types of muffling structures that can be attached to the mouthpiece of a telephone handset. U.S. Pat. No. 5,778,062 Vanmoor discloses a number of such handset attachments that do not take into account the reduced distance between the microphone and the earpiece speaker and, therefore, are not particularly useful in connection with the miniature handset so popular nowadays.

The instant invention results from attempts to overcome the disadvantages of the devices of the prior art.

SUMMARY OF THE INVENTION

The principal and secondary objects of this invention are to provide a convenient and compact attachment to a portable telephone handset that can be deployed to form an effective guide for the sound waves emitted by the user, damp ambient noise and lower the sound volume necessary to ensure an effective communication, while at the same time muffle the user's voice for privacy.

These and other valuable objects are achieved by a series of telescopically engaged and extendible cradle forming components in which the smallest and central one is shaped and dimensioned to tightly nest a miniature telephone handset. The most distally extended component has an hinged cover that can be obliquely oriented to reflect the speaker's sound waves toward the microphone of the handset, and muffle their propagation in other directions for improved privacy.

The attachment can be conveniently collapsed around the handset without significantly increasing its weight and volume.

BRIEF DESCRIPTION OF THE DRAWING

FIG. 1 is a perspective view of a baffle device mounted on a miniature portable telephone handset and shown in the folded position;

FIG. 2 is a top plan view thereof;

FIG. 3 is a side view of the handset and baffle device shown in its deployed position;

FIG. 4 is a side view of an alternate embodiment of the reflector plate; and

FIG. 5 is a top plan view thereof.

DESCRIPTION OF THE PREFERRED EMBODIMENT OF THE INVENTION

Referring now to the drawing, there is shown in FIG. 1, a foldable sound baffle 1 mounted on a portable telephone handset 2. The baffle is shown in its folded position while the handset is not in use for voice communication.

As more specifically illustrated in FIGS. 2 and 3, the baffle 1 comprises a first cradle 3 having a bottom plate 4 substantially commensurate with the back panel 5 of the handset and mounted contiguously against said back panel.

A first pair of side rails 6 projects upwardly from lateral edges of/the bottom plate and against the side walls 7 of the handset. The upper edges of the side rails form a pair of curved flanges 8 that extend over marginal, lateral sections on the front panel 10 of the handset. The first cradle 3 is internally shaped and dimensioned to intimately, yet slidingly, engage over the back panel, side wall and front panel marginal sections of the handset.

A second cradle 11 has a bottom plate 12 and side rails 13 with flanged upper edges 14 that intimately, but slidingly wrap around the first cradle. A pair of nibs 15 projecting laterally from the flanged corner of the second cradle about its most proximal end come into contact with a pair of barriers 16 projecting from the flanged edges of the first cradle about the most distal half of that first cradle, in order to prevent disengagement of the second cradle from the first cradle when the second cradle is pulled distally into the deployment position illustrated in FIG. 3.

A cover plate 17 is hingedly, i.e., rotatively connected along a proximal edge to the distal edge 18 of the second cradle. The plate can be obliquely and adjustably oriented in relation to the second cradle to act as a sound wave reflector that can direct the sound waves emitted by the handset user toward the microphone 19 located in a distal section of the front panel 10 and shown in dotted line in FIG. 1. The cover plate 17 is preferably fitted with a third pair of side rails 20 to form with the two cradles a voice-guiding open top-channel.

As illustrated in FIG. 3, it should be noted that the voice carrying channel can be extended by pulling the handset 2 partially out of the first cradle 3.

A pair of triangular, extensible or foldable webs 21 are spread between the cover plate 17 and the upper edge of the second rail in order to form an adjustable sound barrier on either side of the sound guiding channel.

FIGS. 4 and 5 illustrate an alternate embodiment 22 of the cover plate that also includes an additional voice reflector 23 hingedly secured to the most distal edge 24 of the cover plate. A pair of rigid, triangular flaps 25 hingedly connected to the lower edges of the cover plate's side rails form a cup about the user's mouth acting as a convenient sound barrier fulfilling the same function as the triangular webs 21 of FIG. 3.

It should be noted that the same type of collapsible voice muffler and sound baffle can be used in connection with a variety of voice communication handsets including portable two-way radio sets.

While the preferred embodiments of the invention has been described, modifications can be made and other embodiments may be devised without departing from the spirit of the invention- and the scope of the appended claims.

What is claimed is:

1. A baffle used in connection with a portable telephone handset having a front panel, back panel, opposite lateral walls and a microphone positioned in a lower, distal section of said front panel, said baffle comprising:
   a first cradle shaving a first bottom plate substantially commensurate and contiguous to said back panel, and a first pair of side rails projecting from lateral edges of said bottom plate against said lateral walls;
   a second cradle having a second bottom plate and a second pair of side rails wrapped around said first bottom plate and first pair of side rails;
   means for slidingly securing said second cradle to said first cradle;
   a cover plate; and
   means for hingedly connecting a proximal portion of said cover plate to a distal portion of said second cradle;
   whereby said second cradle can be extended distally from said first cradle and said cover plate can be obliquely oriented in relation to said second cradle to form a reflector and angular channel for guiding sound waves emitted by a user of said handset toward said distal section and microphone.

2. The baffle of claim 1, wherein said cover plate includes a third pair of side rails projecting along lateral edges of said cover plate and against said second pair of side rails.

3. The baffle of claim 1, which further comprises a pair of triangular, foldable or extensible webs secured along two sides to said cover and second pair of side rails.

4. The baffle of claim 1, wherein said first cradle is internally shaped and dimensioned to intimately and slidingly engage over said back panel, lateral walls, and marginal lateral sections of said front panel.

5. The baffle of claim 1, which further comprises extendible means for laterally joining said cover plate to said second pair of side rails.

* * * * *

UNITED STATES PATENT AND TRADEMARK OFFICE
CERTIFICATE OF CORRECTION

PATENT NO. : 7,197,140 B2  Page 1 of 1
APPLICATION NO. : 10/613617
DATED : March 27, 2007
INVENTOR(S) : V. Frank Asaro It is certified that error appears in the above-identified patent and that said Letters Patent is hereby corrected as shown below:

Column 3, line 8, in Claim 1, replace the word "shaving" with -- having --.

Signed and Sealed this

Fifth Day of June, 2007

JON W. DUDAS
*Director of the United States Patent and Trademark Office*